Nov. 10, 1936.    H. ROBERTS ET AL    2,060,748

VALVE MECHANISM

Filed Aug. 31, 1934

Inventors
Hardy Roberts
Charles H. Robertson

By Harchway Tather
Attorneys

Patented Nov. 10, 1936

2,060,748

UNITED STATES PATENT OFFICE 2,060,748

VALVE MECHANISM

Hardy Roberts, Devine, and Charles H. Robertson, Fort Worth, Tex.

Application August 31, 1934, Serial No. 742,296

2 Claims. (Cl. 251—167)

This invention relates to a valve mechanism.

An object of the invention is to provide, in a valve mechanism, a novel type of seat.

Another object of the invention is to provide, in a valve mechanism, a yieldable seat arranged to co-act with the valve whereby a fluid tight joint will be secured between the valve and seat when the valve is seated and whereby the wear on the seat will be reduced to a minimum.

The valve mechanism herein described has been specially designed for use on slush pumps, but the mechanism is capable of being adapted for use generally.

With the above and other objects in view the invention has particular relation to novel features of construction, operation, and arrangement of parts, an example of which is given in this specification and illustrated in the accompanying drawing wherein:—

Figure 1:
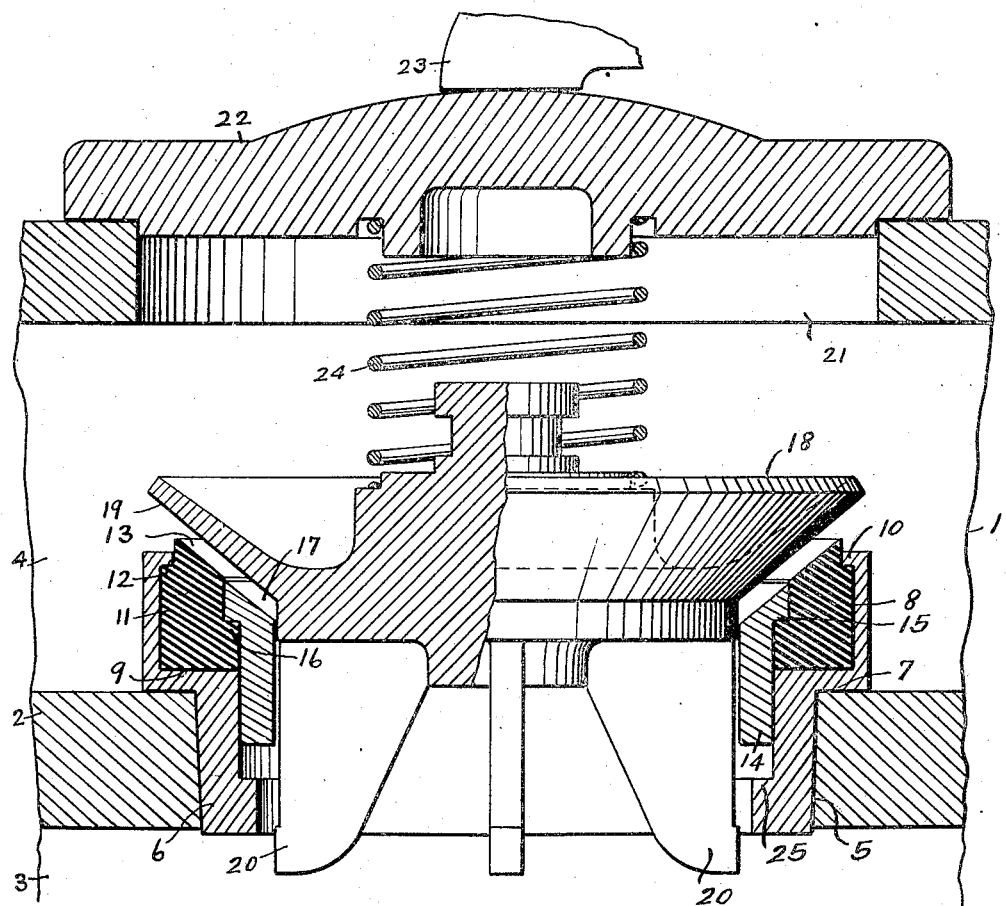
Figure 1 shows a side elevation of the valve mechanism, partly in section.
Figure 2:
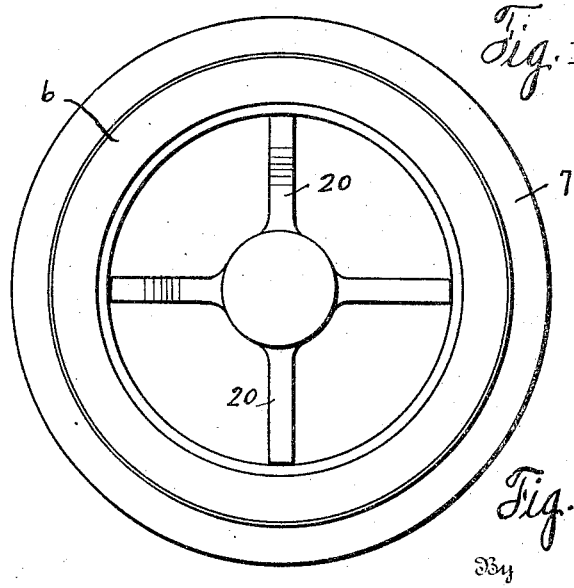
Figure 2 shows a bottom-end view of the valve and seat.

Referring now more particularly to the drawing wherein like numerals of reference designate similar parts in each of the figures. The numeral 1 designates the pump as a whole. This pump has a transverse partition 2, separating the intake chamber 3 from the discharge chamber 4 of the pump. The partition 2, has an opening 5, circular in form, to receive the cage 6. Its lower end is reduced and fitted into the opening 5 and its upper end is widened, forming the annular shoulder 7 which rests on the partition 2. The widened portion of the cage has an inside annular groove 8 whose lower side has the widened flat base 9 and the upper end of the cage has the inwardly extending narrow flange 10. Seated within the groove 8 is a ring 11, preferably formed of rubber and whose upper end is reduced to fit through the flange 10 and to form the external annular shoulder 12 which engages the lower side of said flange.

The upper end of the ring 11 is provided with the upwardly flared face 13.

There is a metal gland 14 whose lower end fits closely within the cage 6 and whose upper end is widened, forming the external annular shoulder 15. The lower portion of the ring 11 is inwardly widened forming the internal annular shoulder 16, said inwardly thickened portion having its inner side flush with the adjacent inside portion of said cage. The shoulder 15 of the gland 14 rests on the shoulder 16 of the ring 11 and the upper end of said gland has the upwardly flared face. The face 13 has substantially the same pitch as the face 17 but is elevated slightly above said face 17.

There is a valve 18 whose under side is provided with the upwardly flared face 19 arranged to cooperate with the faces, 13, 17, which form the valve seat. This valve has the wing-like radial guides 20 which work through the gland 14 and assist in guiding the valve in its movements.

The top of the pump has an opening 21 aligned above the valve and which is closed by the cover plate 22 which is held clamped in place by the one yoke 23, in the usual way.

A coil spring 24 is interposed between the cover plate 22 and the valve 18 and normally holds the valve closed. The lower end of the cage 6 is inwardly thickened forming the inside annular shoulder 25 for cooperation with the guides 20.

Upon the suction stroke of the pump the liquid will be drawn into the chamber 3, the valve being closed and upon the discharge stroke of the pump the valve will be lifted and the pumped liquid will pass out through the seat. As the valve is seated the face 19 will contact first with the face 13 which will yield and permit the valve to seat also against the face 17. The lower end of gland 14 is spaced above the flange 25 and said gland being yieldably seated on the resilient ring 11 the face 17 also will yield as the valve seats thereagainst to the end that the succeeding strokes of the valve against the face 17 will be cushioned and consequently the wear on the face 17 and on the opposing part of the valve itself will be reduced to a minimum. The yieldable face 13 will conform to the contour of the opposing part of the valve face 19 so as to, at all times, form a fluid tight joint with the valve face when the valve is seated.

The drawing and description discloses what is now considered to be a preferred form of the invention by way of illustration only, while the broad principle of the invention will be defined by the appendent claims.

What we claim is:—

1. In a valve mechanism, a cage tubular in form and provided with an external annular shoulder forming a support, said cage having an inside annular groove above said support whose lower end forms a relatively wide base, the upper end of the cage having an inwardly extended narrow flange, a resilient ring fitted in said groove whose upper end is reduced to fit through said flange, forming an external annular shoul- ꞌer which engages the flange, the lower side of said ring resting on said base, said ring having an inside annular shoulder, a tubular metal gland fitted closely through said ring and whose lower end has a loose slidable fit in the cage and whose upper end is widened forming a shoulder which rests on the inside shoulder of said ring, the upper end of said gland and ring being upwardly flared to form a seat.

2. In a valve mechanism, a tubular cage provided with an external annular shoulder forming a support, said cage having an inside annular groove above the support, whose lower end forms a wide base, the upper end of the cage having an inwardly extended narrow flange, a resilient ring fitted in said groove and whose upper end is reduced and fitted through the flange and formed with an external annular shoulder which engages the underside of the flange, the lower side of the ring resting on said base, said ring having an inside upwardly facing annular shoulder, a tubular metal gland fitted closely through said ring and whose lower end is loosely fitted into the cage, and whose upper end is widened forming an annular shoulder which rests on the inside shoulder of the ring, an internal annular shoulder in the cage spaced beneath the lower end of the gland, the upper end of said gland and ring being upwardly flared to form a seat.

HARDY ROBERTS.
CHARLES H. ROBERTSON.